(12) United States Patent
Lee

(10) Patent No.: US 9,547,397 B2
(45) Date of Patent: Jan. 17, 2017

(54) TOUCH WINDOW AND TOUCH DEVICE THE SAME

(71) Applicant: LG INNOTEK CO., LTD., Seoul (KR)

(72) Inventor: Gyu Rin Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 12 days.

(21) Appl. No.: 14/444,604

(22) Filed: Jul. 28, 2014

(65) Prior Publication Data

US 2015/0029150 A1    Jan. 29, 2015

(30) Foreign Application Priority Data

Jul. 29, 2013   (KR) .................. 10-2013-0089661

(51) Int. Cl.
```
G09G 5/00      (2006.01)
G06F 3/044     (2006.01)
G06F 1/16      (2006.01)
G06F 3/047     (2006.01)
```

(52) U.S. Cl.
CPC ............ *G06F 3/044* (2013.01); *G06F 1/1641* (2013.01); *G06F 1/1652* (2013.01); *G06F 3/047* (2013.01); *G06F 2203/04102* (2013.01)

(58) Field of Classification Search
CPC ........ G06F 3/044; G06F 3/047; G06F 1/1641; G06F 1/1652; G06F 2203/04102
USPC .................................................. 345/173, 1.1
See application file for complete search history.

(56) References Cited

U.S. PATENT DOCUMENTS

| | | | |
|---|---|---|---|
| 9,110,326 B2* | 8/2015 | Watanabe | G02F 1/133504 |
| 2009/0153520 A1 | 6/2009 | Jiang et al. | |
| 2011/0304566 A1* | 12/2011 | Han | G06F 3/044 |
| | | | 345/173 |
| 2012/0113614 A1 | 5/2012 | Watanabe | |
| 2012/0127112 A1 | 5/2012 | Lu et al. | |
| 2012/0206896 A1* | 8/2012 | Suzuki | G06F 1/1641 |
| | | | 361/807 |
| 2012/0313887 A1 | 12/2012 | Chen et al. | |
| 2013/0181925 A1 | 7/2013 | Kim et al. | |
| 2013/0265247 A1* | 10/2013 | Yang | G06F 3/041 |
| | | | 345/173 |

OTHER PUBLICATIONS

European Search Report in European Application No. 14172733.9 dated Jan. 9, 2015.

\* cited by examiner

*Primary Examiner* — Jonathan Boyd
(74) *Attorney, Agent, or Firm* — Saliwanchik, Lloyd & Eisenschenk

(57) ABSTRACT

Disclosed is a touch window. The touch window includes a substrate in which an active area and an unactive area are defined; and a sensing electrode on the active area to sense a position, wherein the active area includes a first active area; and a second active area adjacent to the first active area and driven in a driving scheme different from a driving scheme for the first active area.

19 Claims, 9 Drawing Sheets

TOUCH WINDOW AND TOUCH DEVICE THE SAME

CROSS-REFERENCES TO RELATED APPLICATION

This application claims the benefit under 35 U.S.C. §119 of Korean Patent Application No. 10-2013-0089661, filed Jul. 29, 2013, which is hereby incorporated by reference in its entirety.

BACKGROUND

Technical Field

The disclosure relates to a touch window and a touch device including the same.

Recently, a touch panel, which performs an input function through the touch of an image displayed on a touch device by an input device, such as a stylus pen or a hand, has been applied to various electronic appliances.

The touch panel may be typically classified into a resistive touch panel and a capacitive touch panel. In the resistive touch panel, the position of the touch point is detected by detecting the variation of resistance according to the connection between electrodes when pressure is applied to an input device. In the capacitive touch panel, the position of the touch point is detected by detecting the variation in capacitance when a finger of the user is touched on the capacitive touch panel between electrodes. When taking into consideration the convenience of a fabrication scheme and a sensing power, the capacitive touch panel has been spotlighted in a smaller model touch panel recently.

Meanwhile, the demand for a flexible touch panel has been increased recently. That is, if the touch panel is flexible or bendable, the experience of a user will extend. However, indium tin oxide (ITO), which is the most widely used material for the transparent electrode of the touch panel, is easy to be physically damaged when the substrate is flexed and bent, so that the electrode property is deteriorated. Therefore, the indium tin oxide (ITO) is not suitable for a flexible device. Meanwhile, when a flexible material instead of ITO is used for the transparent electrode, the visibility of the flexible material is poorer than that of ITO due to light reflection.

BRIEF SUMMARY

The invention provides a touch window having improved reliability and a display including the same.

In order to accomplish the above object, according to an aspect of the present invention, there is provided a touch window including a substrate, and a sensing electrode provided on the substrate to detect a position. The sensing electrode includes first electrode parts extending in a first direction, second electrode parts extending in a second direction crossing the first direction, and third electrode parts interposed between the first and second electrode parts while extending in a third direction crossing the first and second directions.

According to another aspect, there is provided a touch window including a substrate, and an electrode part provided on the substrate to detect a position. The electrode part includes a first sub-pattern, an electrode layer on the first sub-pattern, and a second sub-pattern adjacent to the first sub-pattern. A length of the second sub-pattern is at least equal to longer than a length of one of first sub-patterns.

As described above, according to an embodiment, in the etching process after the electrode layer has been formed, a non-etching phenomenon is prevented in the electrode layer formed on the second sub-pattern, so that an etching characteristic can be improved. Accordingly, the entire portion of the electrode layer formed on the second sub-pattern is etched, so that the electrode layer may be provided only on the first sub-pattern. Therefore, the reliability of the electrode can be improved. In addition, the electrode layer can be prevented from being viewed by a non-etched part.

DETAILED DESCRIPTION

Figure 1:
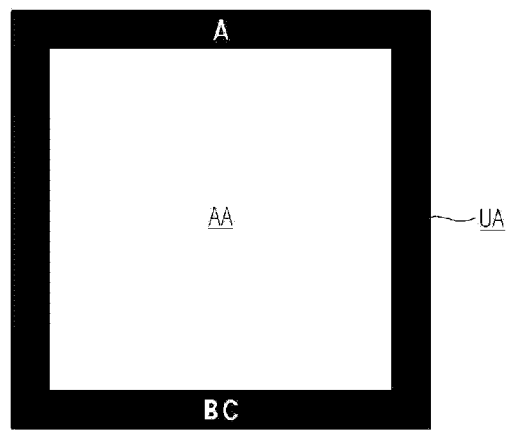
FIG. 1 is a schematic plan view showing a touch window according to an embodiment.

In the following description of the embodiments, it will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

The thickness and size of each layer shown in the drawings may be exaggerated, omitted or schematically drawn for the purpose of convenience or clarity. In addition, the size of elements does not utterly reflect an actual size.

Hereinafter, the embodiment will be described with reference to accompanying drawings.

Figure 2:
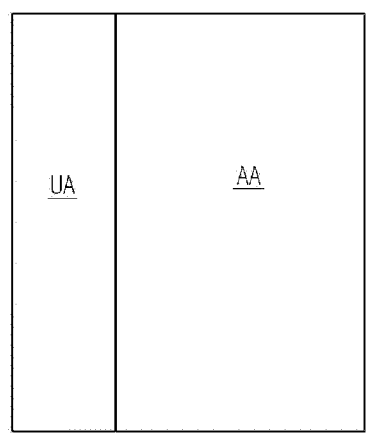
FIGS. 2 to 4 are schematic plan views showing a touch window according to another embodiment.
Figure 3:
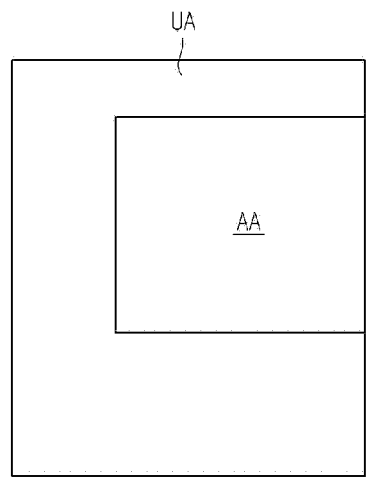
Figure 4:
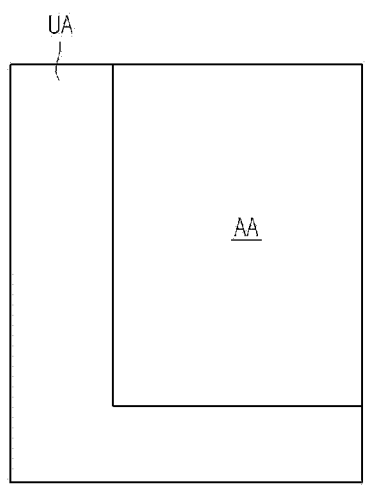

First, a touch window according to the embodiment will be described in detail with reference to FIGS. 1 to 4. FIG. 1 is a schematic plan view showing a touch window according to an embodiment. FIGS. 2 to 4 are schematic plan views showing a touch window according to another embodiment.

Referring to FIGS. 1 to 4, a touch window 10 according to the embodiment includes a substrate 100 having an active area AA, in which a position of an input device (e.g., finger) is detected, and an inactive area UA provided at a peripheral portion of the active area AA.

In this case, sensing electrodes 200 may be formed in the active area AA such that the input device may be sensed. Wires 300 electrically connecting the sensing electrodes 200 to each other may be formed in the inactive area UA. In addition, an external circuit connected to the wires 300 may be placed in the inactive area UA.

Referring to FIG. 1, the inactive area UA may surround the active area AA. The active area AA may include four sides and the inactive area AA may be provided at all of the four sides. That is, the inactive area UA may surround a rim of the active area AA.

However, the embodiment is not limited thereto, but the inactive area UA may be provided at only one side of the active area AA. Referring to FIG. 2, the inactive area UA may be provided at one among four sides of the active area.

In addition, referring to FIG. 3, the inactive area UA may be provided at three among the four sides of the active area AA. That is, the inactive area UA may be provided at all sides of the active AA except for one side of the active area AA.

In addition, referring to FIG. 4, the inactive area UA may be provided at two among the four sides of the active area AA.

As described above, the flexible area of the touch window may be variously formed by variously disposing the inactive area UA.

Figure 5:
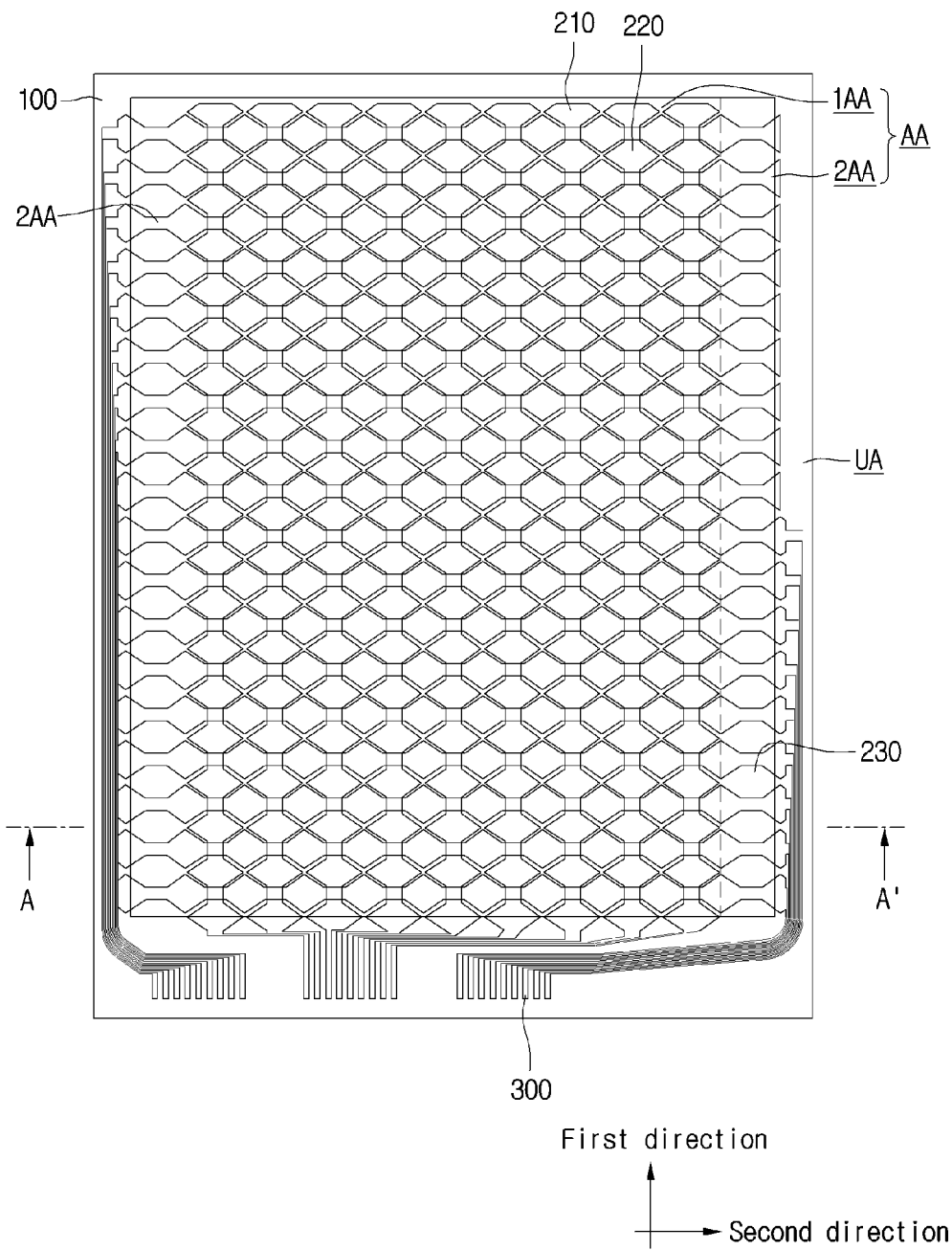
FIG. 5 is a plan view showing a touch window according to an embodiment.
Figure 6:
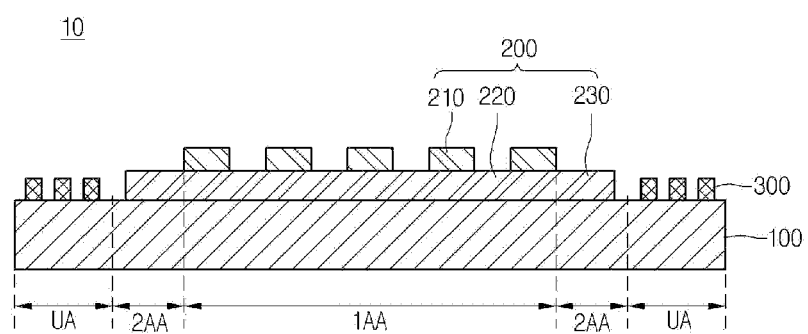
FIGS. 6 and 7 are sectional views taken along line A-A' of FIG. 5.
Figure 7:
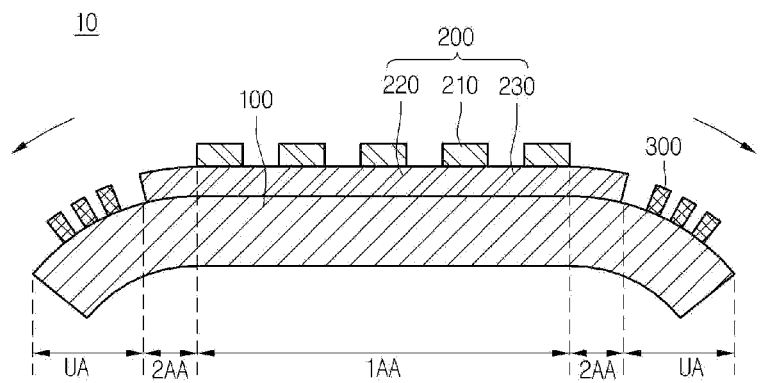

Hereinafter, the touch window according to an embodiment will be described in detail with reference to FIGS. 5 to 7. FIG. 5 is a plan view showing a touch window according to an embodiment. FIGS. 6 and 7 are sectional views taken along line A-A' of FIG. 5.

Referring to FIGS. 5 to 7, the substrate 100 may be formed of various materials to support a sensing electrode 200, a wire 300 and a circuit substrate formed on the substrate. The substrate 100 may include a glass substrate or a plastic substrate including polyethylene terephthalate (PET) film or resin.

The outer dummy layer is formed in the inactive area UA of the substrate 100. The outer dummy layer may be coated with a material having a predetermined color so that the wires 300 and a printed circuit board connecting the wires 300 to external circuits cannot be viewed from the outside. The outer dummy layer may have a color suitable for a desired outer appearance thereof. For example, the outer dummy layer includes black pigments to represent black. In addition, a desired logo may be formed in the outer dummy layer through various schemes. The outer dummy layer may be formed through deposition, print, and wet coating schemes.

The active area AA of the substrate 100 includes first and second areas 1AA and 2AA.

The sensing electrode 200 may be provided in the first active area 1AA. Two types of sensing electrodes 210 and 220 may be provided in the first active area 1AA. The sensing electrode 200 may sense whether an input device such as a finger makes contact with the sensing electrode 200.

The sensing electrode 200 includes first and second sensing electrodes 210 and 220. The first sensing electrode 210 may extend in a first direction (the up and down direction in the drawings). The second sensing electrode 220 may extend in the second direction (the left and right direction in the drawings) crossing the first direction.

The first and second sensing electrodes 210 and 220 may include mutually different materials. In detail, For example, the first sensing electrode 210 may include a first material. The first material may include metallic oxide such as indium tin oxide, indium zinc oxide, copper oxide, tin oxide, zinc oxide, or titanium oxide. The first material is a material which does not interfere with the transmission of light to be very useful for the visibility. However, meanwhile, the first material is a material which is physically damaged when the substrate is bent or flexed.

The second sensing electrode 220 may include a second material different from the first material. For example, the second material may include a nanowire, a carbon nanotube (CNT), grapheme, conductive polymer or various metals. For example, the second sensing electrode 220 may include Cr, Ni, Cu, Al, Ag and Mo, and the alloy thereof. The second material has a flexible property so that the second material may be suitable to be applied to the substrate having the bending and warping property. However, the second material may be disadvantageous in terms of visibility due to the light reflection.

To the contrary, the first sensing electrode may include the second material and the second sensing electrode 220 may include the first material.

Meanwhile, although not shown in the drawings, the sensing electrode 200 may include a conductive pattern. For example, the sensing electrode 200 may be provided in a mesh pattern. In this case, the mesh pattern may be formed in random to prevent a moiré phenomenon. The moiré phenomenon occurs when periodical stripes overlap with each other. Since adjacent strips overlap with each other, a thickness of a strip is thickened so that the strip is spotlighted as compared with other stripes. Thus, in order to prevent such a moiré phenomenon, the conductive pattern may be provided in various shapes.

Preferably, the sensing electrode including the second material may have a conductive pattern.

The conductive pattern may include various patterns such as a rectangular pattern, a straight line pattern, a curved pattern or an oval pattern.

The first or second sensing electrode 210 or 220 in the first active area 1AA may include the first material, so that the visibility of the first active area 1AA may be maintained.

Although not shown in the drawings, an insulating layer may be further included between the first and second sensing electrodes 210 and 220. Thus, the first and second sensing electrodes 210 and 220 may be prevented from being short-circuited with each other.

In addition, the embodiment is not limited thereto, but the first and second sensing electrodes 210 and 220 may be disposed on mutually different members.

If the input device such as the finger touches the first active area 1AA, a capacitance difference between the first and second sensing electrodes 210 and 220 occurs in the touched part by the input device, and the touched part subject to the capacitance difference may be detected as a touch point.

Then, the second active area 2AA may be provided at the side of the first active area 1AA. As shown in the drawings, the second active area 2AA may be provided at both side surfaces of the first active area 1AA.

A sensing electrode 230 is provided in the second active area 2AA. Differently from the first active area 1AA, only one type of sensing electrode 230 may be provided in the second active area 2AA. The sensing electrode 230 may detect whether an input device such as a finger makes contact with the sensing electrode 230.

The sensing electrode includes a third sensing electrode 230. That is, the third sensing electrode 230 may be provided in the second active area 2AA. The third sensing electrode 230 may extend in the first or second direction.

The third sensing electrode 230 may include a material different from that of the first or second sensing electrodes 210 or 220. In addition, the third sensing electrode 230 may include the same material as that of the first or second sensing electrode 210 or 220.

The third sensing electrode 230 may include the second material. Thus, when the first sensing electrode 210 may include the first material and the second sensing electrode 220 may include the second material, the third sensing electrode 230 may extend from the second sensing electrode 220. To the contrary, when the first sensing electrode 210 may include the first material and the second sensing electrode 220 may include the second material, the third sensing electrode 230 may extend from the first sensing electrode 210.

The third sensing electrode 230 may extend from the first or second sensing electrode 210 or 220. For example, as shown in FIG. 2, the third sensing electrode 230 may extend from the second sensing electrode 220. In this case, the second and third sensing electrodes 220 and 230 may be formed integrally with each other. In addition, the third sensing electrode 230 may include the same material as the second sensing electrode 220. That is, as described above, the third sensing electrode 230 may include the second material.

As shown in FIG. 2, the first sensing electrode 210 may be formed of the first material and the second and third sensing electrodes 220 and 230 may be formed of the second material, so that the process may be simplified. That is, the second active area 2AA, which is a flexible area, may be formed simultaneously with the first active area 1AA, so that the process may be reduced.

The second active area 2AA is driven in a scheme different from that of the first active area 1AA. That is, if an input device such as a finger touches the second active area 2AA, the third sensing electrode 230 may sense the position in a self-capacitance scheme. In case of the self-capacitance scheme, if the coordinates are touched, the coordinates are recognized based on the capacitance difference, which is generated due to an additional electronic excitation of capacitance by the finger, together with a time delay.

The first and second active areas 1AA and 2AA may be driven in mutually different schemes so that various types of touch window may be provided. That is, the first active area 1AA may be driven in the same scheme as that of the touch window of the related art and the position may be recognized in the up and down directions in the second active area 2AA, so that the touch window may be driven in a manner such as sound volume, enlarging or reducing of a screen, or moving up or down. Thus, user experience may expand.

The second active area 2AA may be bent from the first active area 1AA. That is, the second active area 2AA is bendable. The third sensing electrode 230 provided in the second active area 2AA includes the second material having a flexible property, so that the third sensing electrode 230 can be bent without any physical damage.

Meanwhile, the inactive area UA is disposed at a side of the second active area 2AA. That is, the inactive area UA is adjacent to the second active area 2AA.

The wire 300 electrically connected to the sensing electrode 200 may be formed in the inactive area UA.

The wire 300 may be formed of a metal having excellent electric conductivity. For example, the wire 300 may include Cr, Ni, Cu, Al, Ag and Mo, and the alloy thereof. Specifically, the wire 300 may include various metallic pastes allowing the wire 300 to be formed through a printing process.

However, the embodiment is not limited to above, but the wire 300 may include a material the same as or similar to that of the sensing electrode. That is, the wire 300 may include metallic oxide such as indium tin oxide, indium zinc oxide, copper oxide, tin oxide, zinc oxide, or titanium oxide. In addition, the wire 300 may include a nanowire, a photosensitive nanowire, grapheme, or conductive polymer.

Meanwhile, the wire 300 may include a conductive pattern. That is, the wire 300 may be provided in a mesh pattern. Thus, the wire 300 may be hidden so that the inactive area UA may be transparent. Therefore, the touch window may be applied to a transparent touch device.

Hereinafter, a touch window according to another embodiment will be described with reference to FIGS. 8 and 9. In the following description, the detailed descriptions about the parts similar or identical to those described above will be omitted in order to avoid redundancy.

Figure 8:
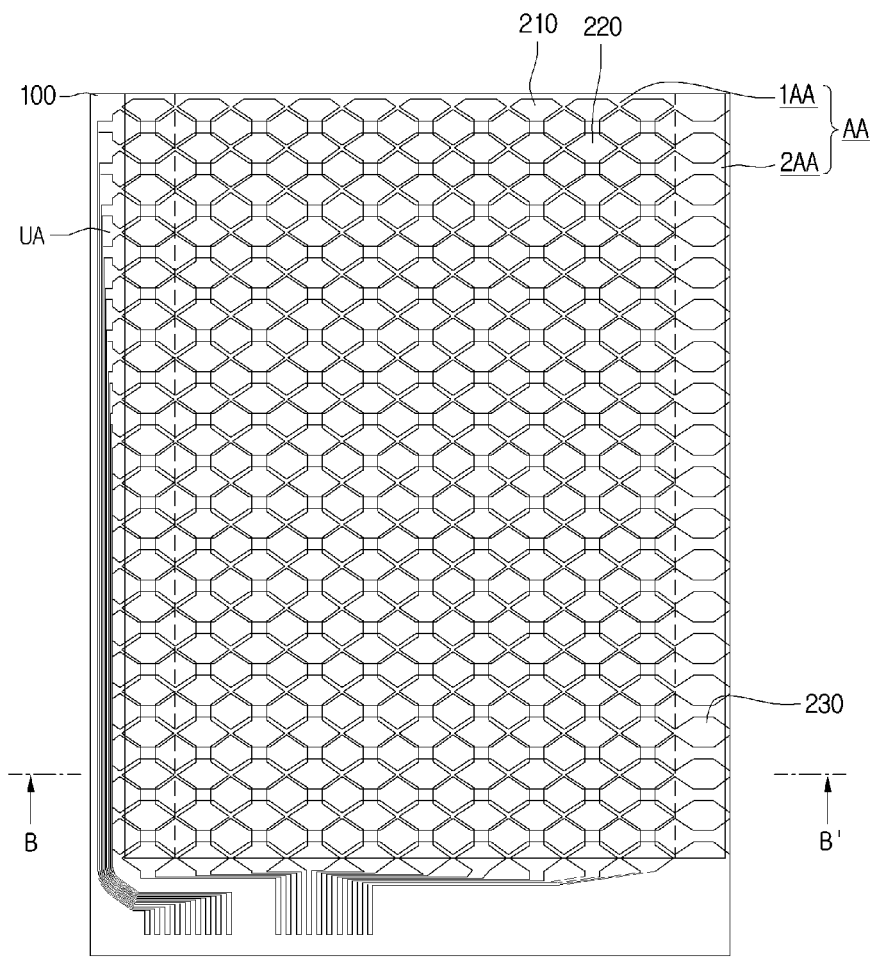
FIG. 8 is a plan view showing a touch window according to another embodiment.
Figure 8:
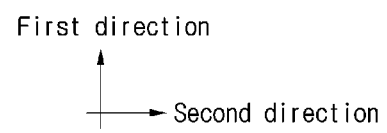
Figure 9:
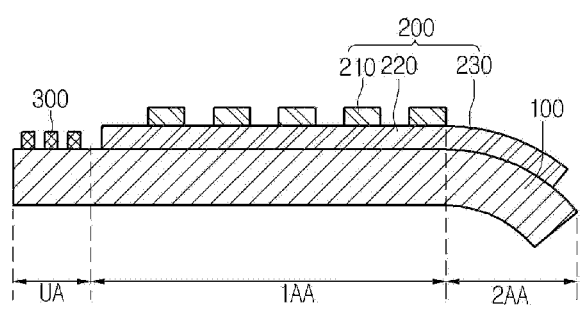
FIG. 9 is a sectional view taken along line B-B' of FIG. 8.

Referring to FIGS. 8 and 9, an active area AA may include a first active area 1AA and a second active area 2AA bent from the first active area 1AA, and an inactive area UA may not be provided at one side of the second active area 2AA. Further, the second inactive area 2AA may be provided only at one side of the first active area 1AA.

In addition, the inactive area UA may be provided at two of four sides of the active area AA. The inactive area UA may be provided only at the sides of the first active area 1AA. Further, the inactive area UA may not be provided at any sides of the second active area 2AA.

Thus, a touch window, of which only one side is bendable, may be implemented. Therefore, the structural variety of a flexible touch window may be achieved.

Figure 10:
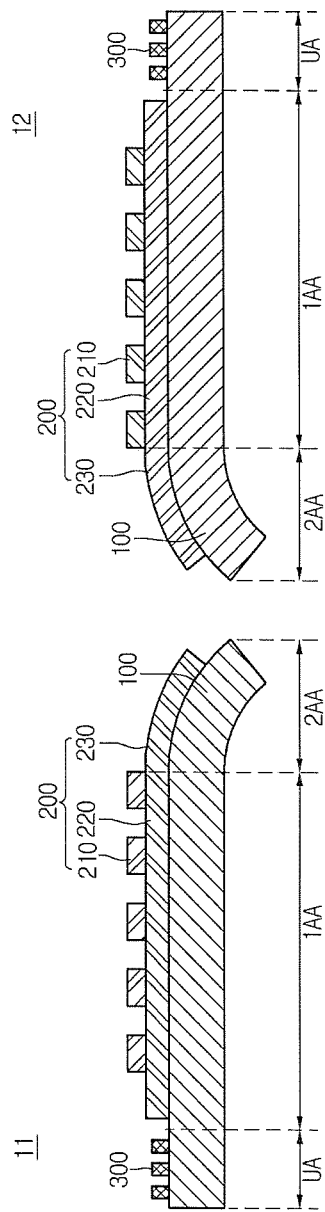
FIGS. 10 and 11 are sectional views showing a touch window according to still another embodiment.
Figure 11:
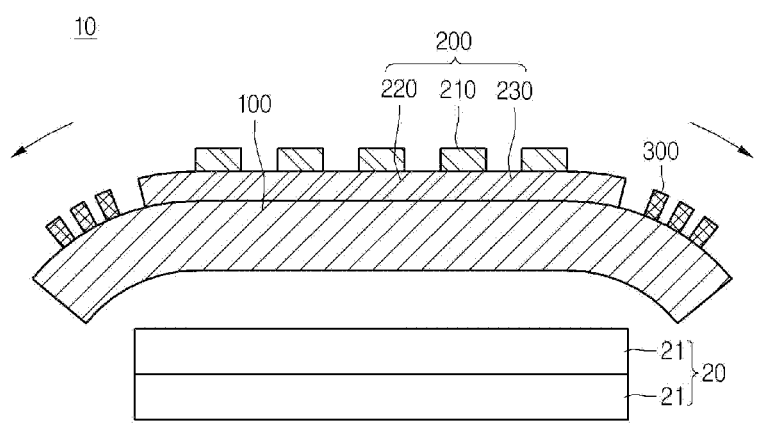

Hereinafter, a touch window according to still another embodiment will be described with reference to FIGS. 10 and 11. FIGS. 10 and 11 are sectional views showing a touch window according to still another embodiment.

First, referring to FIG. 10, the touch window includes first and second touch windows 11 and 12. Each of the first and second touch windows 11 and 12 may be identical to the touch window of FIG. 9 described above.

The first touch window 11 may make contact with the second touch window 12 at second active areas 2AA provided at each side of the first and second touch windows 11 and 12. That is, the first and second touch windows 11 and 12 may be disposed to enable the second active areas 2AA to meet each other. Thus, a foldable touch window may be provided through the first and second touch windows 11 and 12. Meanwhile, referring to FIG. 11, the touch window 10 may be combined with a driving part 20 and a light source part 30, so that a touch device may be implemented.

Specifically, the driving part 20 may be a display panel. A display region to output an image is formed in the display panel 20. A display panel applied to the touch device may generally include an upper substrate 21 and a lower substrate 22. A data line, a gate line and a thin-film transistor (TFT) may be formed in the lower substrate 22. The upper substrate 21 may be adhesive to the lower substrate 22 such that the elements provided on the lower substrate 22 may be protected.

The display panel 20 may be formed in various types according to the type of touch device. That is, the touch device according to the embodiment may include a liquid-crystal device (LCD), a field emission display, a plasma display panel (PDP), an organic light-emitting diode (OLED), and an electronic paper display (EPD). Thus, the display panel 20 may be implemented in various types.

Figure 12:
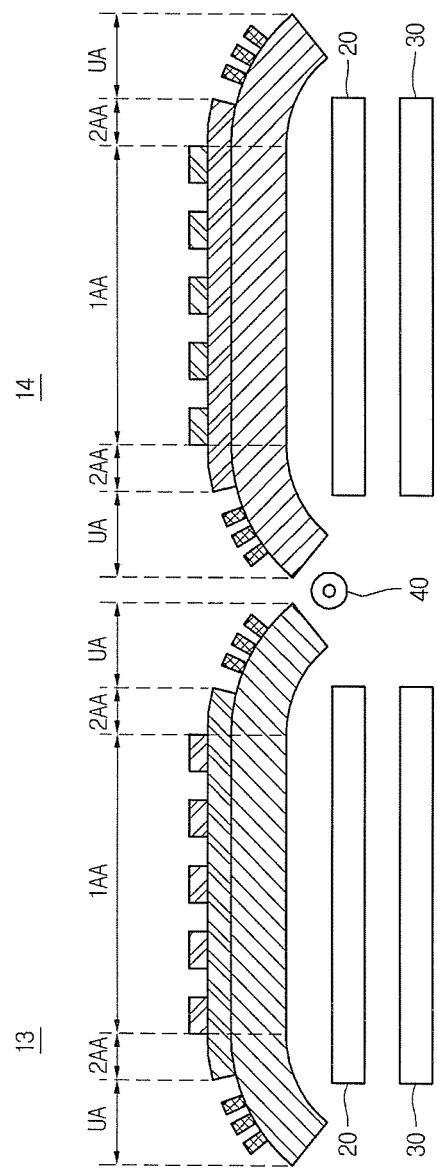
FIG. 12 is a sectional view showing a touch device in which a touch window is disposed on a display panel according to an embodiment.

Meanwhile, referring to FIG. 12, a touch window may include third and fourth touch windows 13 and 14. The third and fourth touch windows 13 and 14 may be combined with a driving part 20 and a light source part 30, so that a touch device may be implemented.

Further, as described above, the third and fourth touch windows 13 and 14 may be identical to the touch window of FIG. 7. In addition, the third and fourth touch windows 13 and 14 may make contact with each other at the inactive areas UA thereof. That is, the third and fourth touch windows 13 and 14 may be disposed to enable the inactive areas UA to meet each other.

Specifically, the third and fourth touch windows 13 and 14 may be coupled through a coupling part 40 disposed between the third and fourth touch windows 13 and 14.

A touch device, which is foldable through the third and fourth touch windows 13 and 14, may be provided. Thus, various types of touch device may be implemented.

Meanwhile, the touch window may include a curved touch window. Thus, a touch device including the touch window may be a curved touch device. In addition, the first or second sensing electrode 210 or 220 may include a conductive pattern, so that the bending property and the reliability of the touch window may be improved.

Meanwhile, the touch window may include a flexible touch window. Thus, the display device may be flexible touch device. Therefore, a user may allow the display device to be flexible or bendable with his hand. In addition, the first or second sensing electrode 210 or 220 may include a conductive pattern, so that the bending property and the reliability of the touch window may be improved.

Meanwhile, the touch window may be applied to a vehicle as well as a touch device of a mobile terminal. In addition, the touch window may be applied to a dashboard as well as a personal navigation display (PND) of vehicle navigation, so that a center information display (CID) may be implemented.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch window comprising:
  a substrate in which an active area and an inactive area are defined;
  a sensing electrode on the active area to sense a position;
  a wire on the inactive area electrically connected to the sensing electrode; and
  an outer dummy layer on the inactive area;
  wherein the active area includes a first active area and a second active area adjacent to the first active area and driven in a driving scheme different from a driving scheme for the first active area,
  wherein the sensing electrode includes a first sensing electrode and a second sensing electrode in the first active area,
  wherein the sensing electrode includes a third sensing electrode in the second active area;
  wherein the first sensing electrode, the second sensing electrode, and the third sensing electrode are in direct physical contact with one side of the substrate;
  wherein the first and second sensing electrodes include mutually different materials,
  wherein the inactive area is disposed at at least one side of four sides of the active area,
  wherein the inactive area and the first active area are each a planar area,
  wherein the second active area is a curved area; and
  wherein the third sensing electrode comprises one of a nanowire, a carbon nanotube, graphene, a conductive polymer, and a metal.

2. The touch window of claim 1, wherein the third sensing electrode extends from one of the first and second sensing electrodes.

3. The touch window of claim 1, wherein the second active area is bent from the first active area.

4. The touch window of claim 1, wherein the second active area is provided at a side of the first active area.

5. The touch window of claim 1, wherein the inactive area is provided at a side of the second active area.

6. The touch window of claim 1, wherein the inactive area is provided at a side of the first active area.

7. The touch window of claim 1, wherein at least one of the first to third sensing electrodes includes a conductive pattern.

8. The touch window of claim 1,
  wherein the first sensing electrode includes a first material,
  wherein the first material includes metallic oxide,
  wherein the second sensing electrode includes a second material different from the first material,
  wherein the second material comprises at least one selected from the group consisting of: Cr, Ni, Cu, Al, Ag, and Mo; and
  wherein the third sensing electrode includes the second material.

9. The touch window of claim 8,
  wherein the second sensing electrode and the third sensing electrode are provided in a mesh pattern.

10. The touch window of claim 1, wherein a material of the third sensing electrode corresponds to a material of one of the first sensing electrode and the second sensing electrode,
  wherein the other of the first sensing electrode and the second sensing electrode comprises indium tin oxide (ITO).

11. A touch window comprising:
  a substrate in which an active area and an inactive area are defined;
  a sensing electrode on the active area to sense a position;
  a wire on the inactive area electrically connected to the sensing electrode; and
  an outer dummy layer on the inactive area;
  wherein the active area includes first and second active areas,
  wherein the first active area includes a first sensing electrode and a second sensing electrode crossing the first sensing electrode,
  wherein the second active area includes a third sensing electrode and one selected from the first and second sensing electrodes;

wherein the first sensing electrode, the second sensing electrode, and the third sensing electrode are in direct physical contact with one side of the substrate;

wherein the first and second sensing electrodes include mutually different materials, wherein an insulating layer is disposed between the first and second sensing electrodes, wherein the first sensing electrode extends in a first direction, wherein the second sensing electrode extends in a second direction, wherein the third sensing electrode extends in the first or second direction, wherein the inactive area and the first active area are each a planar area, wherein the second active area is a curved area; and wherein the third sensing electrode comprises at least one selected from the group consisting of: a nanowire, a carbon nanotube (CNT), graphene, a conductive polymer, and a metal.

12. The touch window of claim 11, wherein a material of the third sensing electrode corresponds to a material of one of the first sensing electrode and the second sensing electrode, wherein the other of the first sensing electrode and the second sensing electrode comprises indium tin oxide (ITO).

13. A touch device comprising:

a first touch window and a second touch window; and a driving part on the first or second touch window, wherein each of the first and second touch windows includes:

a substrate in which an active area and an inactive area are defined, a sensing electrode on the active area to sense a position;

a wire on the inactive area electrically connected to the sensing electrode; and an outer dummy layer on the inactive area;

wherein the active area includes first and second active areas, wherein the first active area includes a first sensing electrode and a second sensing electrode crossing the first sensing electrode, wherein the second active area includes a third sensing electrode and one selected from the first and second sensing electrodes;

wherein the first sensing electrode, the second sensing electrode and the third sensing electrode are in direct physical contact with en-one side of the substrate;

wherein the second active area is bent from the first active area, wherein the second active area is disposed only at one side of the first active area, and wherein the first touch window makes contact with the second touch window at second active areas provided at each side of the first and second touch windows, wherein an insulating layer is disposed between the first and second sensing electrodes, wherein the first sensing electrode extends in a first direction, wherein the second sensing electrode extends in a second direction, wherein the third sensing electrode extends in the first or second direction, wherein the inactive area and the first active area are each a planar area, wherein the second active area is a curved area; and wherein the third sensing electrode comprises at least one selected from the group consisting of: a nanowire, a carbon nanotube (CNT), graphene, a conductive polymer, and a metal.

14. The touch device of claim 13, wherein the first and second touch windows make contact with each other in the second active area.

15. The touch device of claim 13, wherein the first or second touch window includes a curved touch window or a flexible touch window.

16. The touch device of claim 13, wherein the inactive area is disposed only at one side of the first active area.

17. The touch device of claim 13, wherein a material of the third sensing electrode corresponds to a material of one of the first sensing electrode and the second sensing electrode, wherein the other of the first sensing electrode and the second sensing electrode comprises indium tin oxide (ITO).

18. The touch device of claim 13, wherein the driving part comprises an upper substrate and a lower substrate.

19. The touch device of claim 13, wherein the driving part comprises at least one selected from the group consisting of: a liquid-crystal device (LCD), a field emission display, a plasma display panel (PDP), an organic light-emitting diode (OLED), and an electronic paper display (EPD).

* * * * *